US008479201B2

(12) United States Patent
Goller et al.

(10) Patent No.: US 8,479,201 B2
(45) Date of Patent: Jul. 2, 2013

(54) PROCESSOR WITH HARDWARE SOLUTION FOR PRIORITY INVERSION

(75) Inventors: Volker Ewald Goller, Aachen (DE); Andrew David Alsup, Alququerque, NM (US)

(73) Assignee: Innovasic, Inc., Albuquerque, NM (US)

( * ) Notice: Subject to any disclaimer, the term of this patent is extended or adjusted under 35 U.S.C. 154(b) by 1644 days.

(21) Appl. No.: 11/522,796

(22) Filed: Sep. 18, 2006

(65) Prior Publication Data

US 2008/0072227 A1    Mar. 20, 2008

(51) Int. Cl.
*G06F 9/46*    (2006.01)
(52) U.S. Cl.
USPC ............ 718/100; 718/102; 718/103; 718/108
(58) Field of Classification Search
USPC .................. 718/100, 102, 103, 108
See application file for complete search history.

(56) References Cited

U.S. PATENT DOCUMENTS

| | | | |
|---|---|---|---|
| 5,758,188 A | 5/1998 | Appelbaum et al. | |
| 6,212,544 B1 * | 4/2001 | Borkenhagen et al. | 718/103 |
| 6,401,154 B1 | 6/2002 | Chiu et al. | |
| 6,499,048 B1 * | 12/2002 | Williams | 718/102 |
| 6,625,719 B2 | 9/2003 | Leach et al. | |
| 2002/0038416 A1 * | 3/2002 | Fotland et al. | 712/228 |
| 2003/0070021 A1 * | 4/2003 | Joy et al. | 710/200 |
| 2003/0189940 A1 | 10/2003 | Greenblat | |
| 2004/0123295 A1 * | 6/2004 | Karam et al. | 718/102 |
| 2004/0154018 A1 * | 8/2004 | Doering et al. | 718/100 |
| 2004/0215932 A1 * | 10/2004 | Burky et al. | 712/43 |
| 2005/0149936 A1 * | 7/2005 | Pilkington | 718/102 |
| 2005/0149937 A1 * | 7/2005 | Pilkington | 718/102 |
| 2006/0117316 A1 * | 6/2006 | Cismas et al. | 718/103 |
| 2006/0282836 A1 * | 12/2006 | Barker | 718/103 |

OTHER PUBLICATIONS

Akgul, B.E.S.; Mooney III, V.J.; Thane, H.; Kuacharoen, P.; "Hardware support for priority inheritance"; Real-Time Systems Symposium, 2003. RTSS 2003. 24th IEEE; Issue Date: Dec. 3-5, 2003; On pp. 246-255.*

* cited by examiner

*Primary Examiner* — Emerson Puente
*Assistant Examiner* — Charles Swift
(74) *Attorney, Agent, or Firm* — Donald J. Lenkszus

(57) ABSTRACT

A method for preventing priority inversion in a processor system having an operating system operable in a plurality of contexts is provided. The method comprises: providing a plurality of context control registers with each context control register being associated with a corresponding one context for controlling execution of the context; providing a plurality of sets of hardware registers, each set corresponding to one context of the plurality of contexts; and utilizing the plurality of context control registers and said plurality of sets of hardware registers to prevent priority inversion.

13 Claims, 5 Drawing Sheets

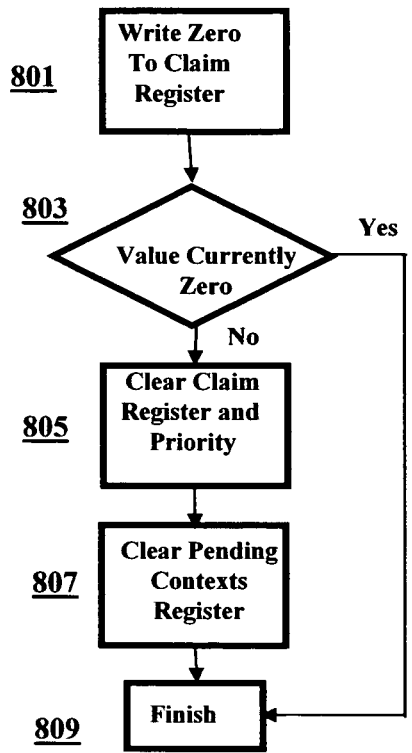 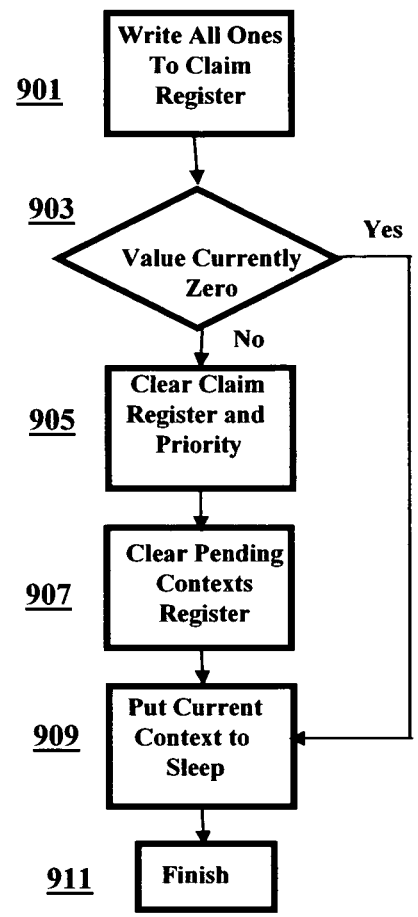
FIG. 8
FIG. 9

PROCESSOR WITH HARDWARE SOLUTION FOR PRIORITY INVERSION

FIELD OF THE INVENTION

The present invention pertains to a processor systems, in general, and to methods and apparatus eliminating a priority inversion problem in a multi-thread processor system, in particular.

BACKGROUND OF THE INVENTION

One problem encountered in multi-thread processor systems is that of how to manage limited shared resources among numerous threads of execution. This is no less true with a microprocessor hardware kernel. Management of resources may be accomplished entirely in software by a master thread or context. However, the resulting overhead is not desirable. In addition, managing the resources in software via a master context also effectively locks out any intermediate priority contexts, i.e., intermediate between the master thread and the thread(s) whose priority is being manipulated, while the manipulations are taking place.

Adding to the complexity of handling such shared resources is what is generally referred to as "priority inversion". Priority inversion occurs when a standard semaphore is used to control some element of the system and the following sequence occurs:

a) A low priority thread takes the semaphore—it will only need to hold it for a small amount of execution time.
 b) A high priority thread begins execution (preempting the low priority thread) and tries to take the same semaphore. It can't take it so it is now pending on the low priority thread.
 c) A medium priority thread pre-empts the low priority context before it can release the semaphore.

At the point that the medium priority thread pre-empts the low priority thread, the high priority thread ends up waiting on the execution of the medium priority thread, even though they are not trying to access the same device. This is referred to as priority inversion.

Research on priority inversion has yielded two solutions. The first is called priority inheritance. This technique mandates that a lower-priority thread inherit the priority of any higher-priority thread pending on a resource they share. This priority change should take place as soon as the high-priority thread begins to pend; it should end when the resource is released. This requires help from the operating system.

If priority inheritance were used in the scenario above, then at point 'b)', when the high priority thread goes pending on the low priority context, the low priority thread would 'inherit' the priority of the other thread until it released the semaphore and the medium priority thread would never come into play.

Another solution is what is called a priority ceiling. In this case, the resource that is being managed is assigned a priority, typically as high as or higher than the priority of any thread/context that may access it. When a thread takes control of the resource (takes the semaphore), it assumes the priority of the resource. In this fashion the inversion described above can not take place because the low priority context will have the high priority of the resource while it is using it.

The underlying problem is a software problem and in the past, the priority ceiling and priority inheritance solutions have been software solutions to the software problems.

SUMMARY OF THE INVENTION

In accordance with the principles of the invention a processor hardware kernel includes a hardware priority inheritance or a hardware priority ceiling solution to prevent priority inversion from occurring during software operation.

In accordance with the principles of the invention, a method for preventing priority inversion in a processor system having an operating system operable in a plurality of contexts is provided. The method comprises: providing a plurality of context control registers with each context control register being associated with a corresponding one context for controlling execution of the context; providing a plurality of sets of hardware registers, each set corresponding to one context of the plurality of contexts; and utilizing the plurality of context control registers and said plurality of sets of hardware registers to prevent priority inversion.

Still further in accordance with the principles of the invention the method comprises operating the plurality of sets of hardware registers in conjunction with the plurality of context control registers to provide priority inheritance or to provide priority ceiling.

Yet further in accordance with the principles of the invention, the method includes selectively operating the plurality of sets of hardware registers in conjunction with the plurality of context control registers to provide priority inheritance or priority ceiling to prevent priority inversion.

In the illustrative embodiment of the invention the method comprises: providing a plurality of context control registers, each context control registers being associated with a corresponding one context of the plurality of contexts for controlling execution of the corresponding context; providing a plurality of sets of hardware registers, each set corresponding to one context of the plurality of contexts; providing in each set one register having a field that is conditionally writeable; operating each one register such that a second context will attempt to write a value to the field to seize control from a first context; operating the one register such that if a write of a predetermined value to the field is successful, the second context takes a claim and may proceed to execute; further operating the one register such that if the write is not successful the second context will pend until the first context completes execution; and loaning the priority of the second context to the first context while the first context is executing.

Still further in the illustrative embodiment, the method includes providing in each set of hardware registers a claim priority register; operating each claim priority register such that it has a priority field that is initially in a first state representative of a first priority; operating each claim priority register such that if its corresponding context successfully writes said value to the one register of the same set and a higher priority third context then tries to take the same claim by writing the same value to the one register, then the priority of the third priority context is written in the priority field; and operating each claim priority register such that when the second context relinquishes the claim, the claim priority register is either returned to the first state or is ignored.

Still further in accordance with an aspect of the invention, priority for a context to be executed is determined from the higher of a priority assigned to the context in a priority field of a corresponding one context control register and the value of the priority field of the corresponding said claim priority register.

Further in accordance with an aspect of the invention, the method comprises: providing in said set of registers one register comprising a plurality of flag fields, each of the flag fields corresponding to one context of the plurality of contexts; and controlling the execution of each other context of the contexts by controlling the state of each flag field of the one register being used to control the execution of its corresponding one context.

In accordance with the principles of the invention, a processor system having an operating system operable in a plurality of contexts, comprises: a hardware processor kernel comprising a plurality of context control registers, each of the context control registers being associated with a corresponding one context of the plurality of contexts for controlling execution of a context; and a plurality of sets of hardware registers, each set of corresponding to one context of the plurality of contexts and being automatically operable with said plurality of context control registers to prevent priority inversion.

Still further in accordance with the principles of the invention, each set of hardware registers comprises one register having a field that is conditionally writeable. In addition, each one register is operable such that a second context will attempt to write a value to the field to lay claim to a value. If a first context has already laid claim to the same value, then the first context will inherit the priority of the second context and continue to execute. The second context will pend until the first context relinquishes its claim. If a write of a predetermined value to said field is successful the second context takes a claim and may proceed to execute. If the write of the predetermined value to the field is not successful the second context will pend until the first context completes execution.

BRIEF DESCRIPTION OF THE DRAWING

The invention will be better understood from a reading of the following detailed description of an illustrative embodiment taken in conjunction with the drawing figures in which like reference designators are used to identify like elements, and in which:

FIGS. 5 through 9 illustrate operation of the processor of FIG. 4.

DETAILED DESCRIPTION

In accordance with the principles of the invention, priority inheritance and priority ceiling solutions to priority inversion problems are solved by providing a set of hardware registers in a processor hardware kernel. The registers are defined for each context except the master context of a processor.

Figure 1:
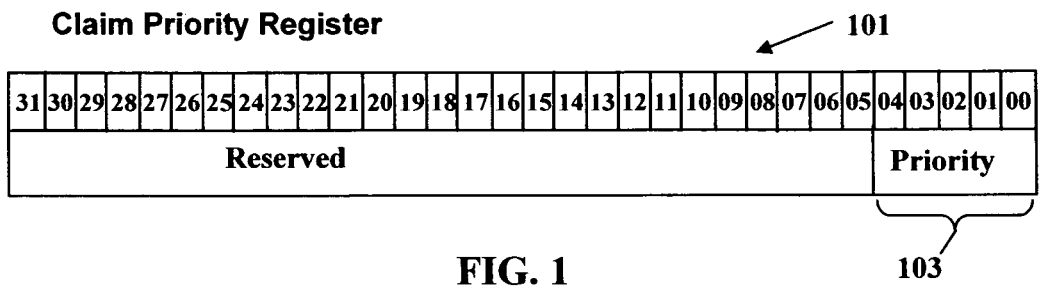
FIG. 1 illustrates a first register layout in accordance with the principles of the invention.
Figure 2:
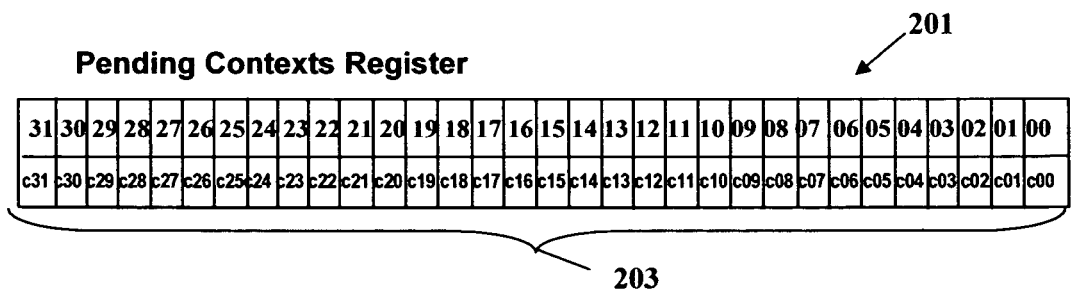
FIG. 2 illustrates a second register layout in accordance with the principles of the invention.
Figure 3:
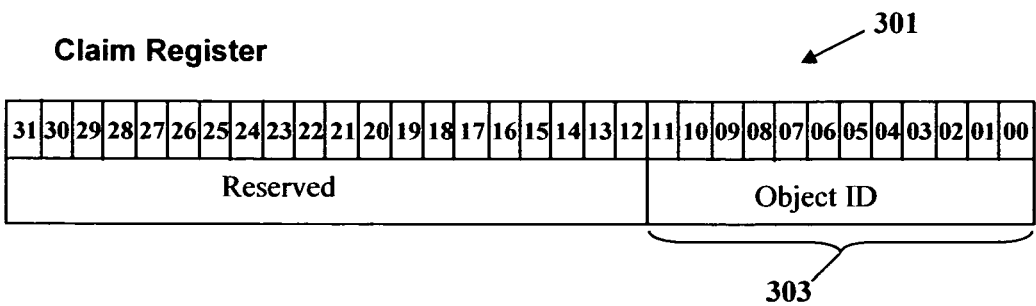
FIG. 3 illustrates a third register layout in accordance with the principles of the invention.
Figure 4:
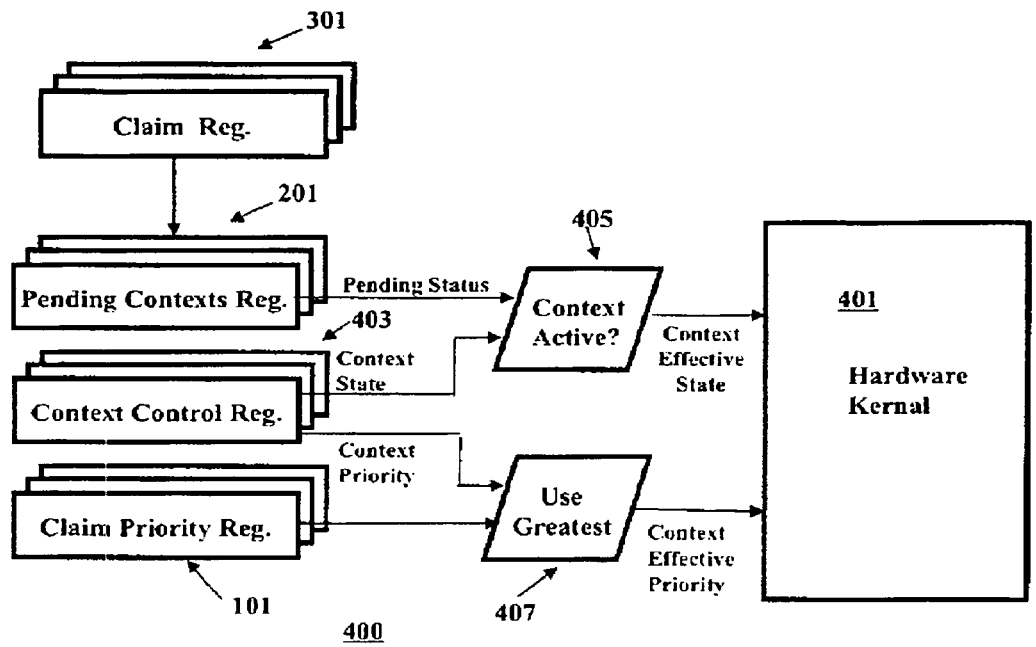
FIG. 4 is a partial block diagram of a processor in accordance with the principles of the invention.

FIG. 4 illustrates a representative processor hardware kernel to which the invention is applied and FIGS. 1 through 3 illustrate the hardware registers that are provided to prevent priority inversion in greater detail. Hardware kernel 401 can be the microprocessor described in United States Patent Application Publication Nos. US-2006-0168426-A1, US-2006-0168428-A1, US-2006-0168420-A1, and US-2006-0168421-A1. The entireties of the disclosures of each of those Publication Nos. are incorporated herein by reference.

FIG. 1 illustrates a pending inheritance or Claim Priority Register 101. This register is a dedicated hardware register. This register in the illustrative embodiment is a 32 bit register. Those skilled in the art will appreciate that this and the other hardware registers are 32 bit registers, but in other implementations, other bit length registers may be utilized. The value stored in the priority field 103 of Claim Priority Register 101 overrides the value in the Context Control Registers 403 if the stored value in the priority field 103 is of a higher priority than that of the Context Control Registers 403. Claim Priority Register 101 is not writeable by software, it is reset to 0x000 (lowest priority). The loading of other values into register Claim Priority Register 101 is described below.

FIG. 2 illustrates the Pending Contexts Register 201. If one of the flags c0 through c31 in register 201 is set then the corresponding context is held from execution until the flag is cleared. This register is not writeable by software.

Figure 7:
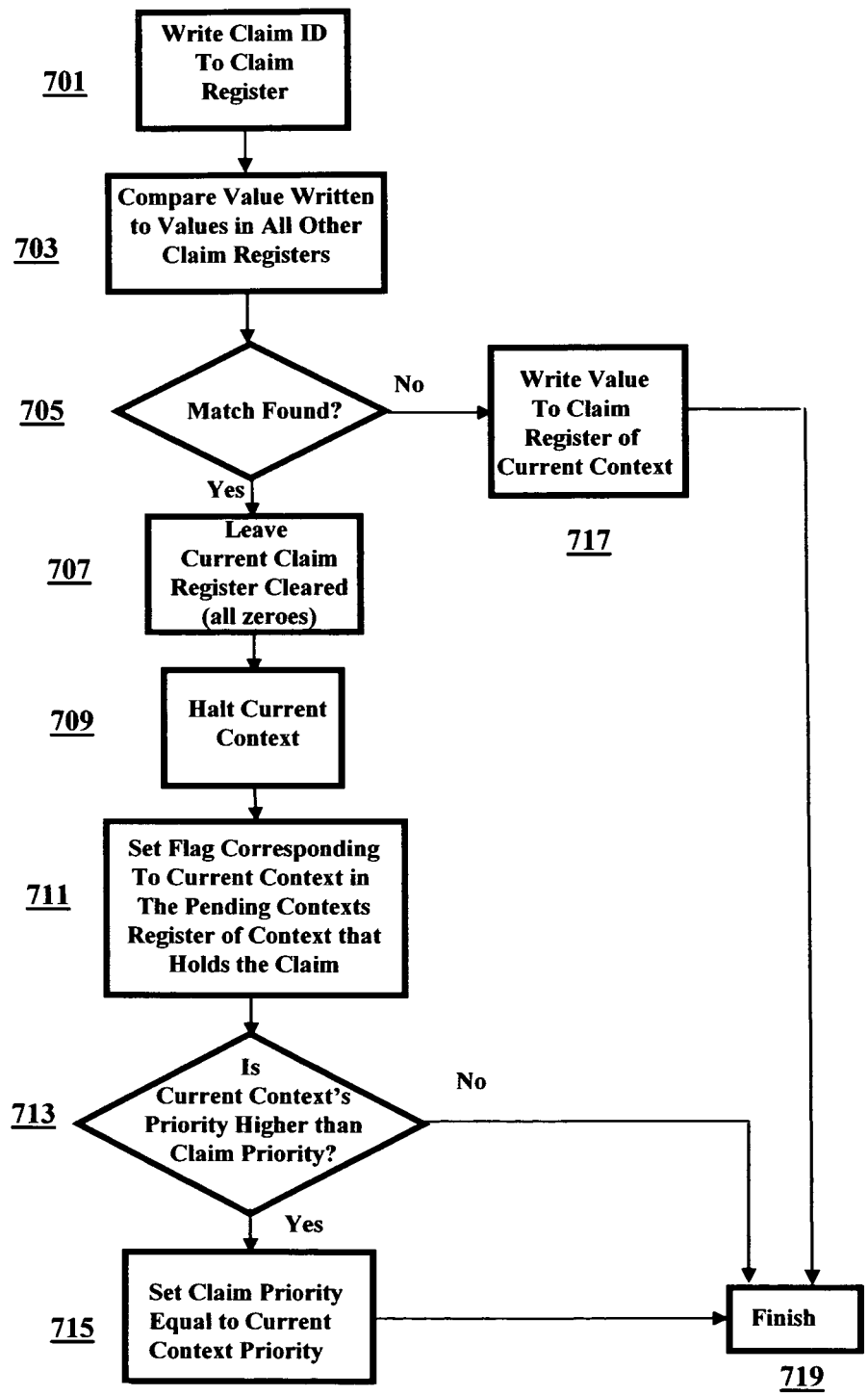

FIG. 3 illustrates the Claim Register 301. FIG. 7 illustrates the operation of Claim Register 301 to write a non-zero value into the Object ID field 303. The Object ID field 303 can be written to a non-zero value by the context associated with Claim Register 301 if no other Claim Register 301 associated with another context contains the same value. This is illustrated in FIG. 7. At step 701 a Claim ID is to be written into the Object ID field 303. At step 703 the value written into Object ID field 303 is compared to the values written in all other Claim Registers. If, at step 705 it is determined that a match is found, then at step 707 the Current Claim Register 301 is cleared to all zeros. Then, at step 709, the current context is halted and then, at step 711 a flag corresponding to the current context is set in Pending Contexts Register 201 of the context that holds the claim. At step 713, a determination is made as to whether the current context priority is higher than the claim priority. If the determination is affirmative, then, at step 715, the claim priority is set equal to the current context priority and the operation is finished at step 719. Also if at step 713, the determination is that the current context priority is not higher than the claim priority, then the operation is finished at step 719. If, at step 705, it is determined that a match is not found, then the value is written to the claim register of the current context as step 717 and the operation is finished at step 719.

The Object ID field 303 can be written to a non-zero value by the context associated with Claim Register 301 if another Claim Register 301 associated with another context has the same value already in its Object ID field. In that case, no write takes place to the Claim Register 301. For the context that has already "claimed" the value, the flag corresponding to the current context is set in the Pending Contexts Register 201. If the priority of the current context is higher than that in the Priority Inheritance Register 101 of the context that holds the claim then the current priority overwrites it thereby raising the priority of the context that holds the claim.

The Object ID field 303 can be written to all zeros by the context associated with Claim Register 301. The operational method utilized is shown in FIG. 8. At step 801, the Object ID field 303 is to be written to all zeros. A determination is made at step 803 to determine if the Object ID field 303 is presently all zeros. If the Object ID field 303 is not all zeros, then at step 805 the Priority Inheritance Register 101 is cleared returning precedence to the Context Control Registers 403 and Claim Register 301 is cleared thereby relinquishing the context's claim on the object. At step 807 the Pending Contexts Register 201 is cleared, thereby freeing for execution any pending contexts, and the context associated will be put to the "NOT READY" state and the operation is finished at step 809. If the Object field 303 is all zeros at step 803, then the operation is finished at step 809.

The Object ID field 303 can be written to all ones by the context associated with Claim Register 301. The operational method utilized is shown in FIG. 9. At step 901, the Object ID field 303 is to be written to all ones. A determination is made at step 903 to determine if the Object ID field 303 is presently all zeros. If the Object ID field 303 is not all zeros, then at step 905 the Priority Inheritance Register 101 is cleared returning precedence to the Context Control Registers 403 and Claim Register 301 is cleared thereby relinquishing the context's claim on the object. At step 907 the Pending Contexts Register 201 is cleared, thereby freeing for execution any pending contexts, and the context associated will be put to the "NOT READY" state. At step 909, the current context is put to sleep and the operation is finished at step 911. If the Object field 303 is all zeros at step 903, then the next step is step 909. At step 909, the current context is put to sleep and the operation is finished at step 911.

A write by a context not associated with a Claim Register 301 will have no effect.

Each Context Control Register 403 has two fields of interest: a priority field and a state field.

The claim register 301 is where significant activity occurs from a context perspective. The operating system will attempt to write a value to the claim register 301 to take a claim. If the write is successful the context takes the claim and may proceed. If the write is not successful the context will pend until the context that has taken the claim is done. The priority of the executing context is loaned to the pending context. The claim register 301 is read, it is recognized that the claim attempt was unsuccessful, and the attempt to write a value to the claim register is repeated.

The operation of system 400 with respect to how effective priority and active state are calculated is now described.

A given context gets the processor if:
1) The state field in its Context Control Register 403 is in the 'ready' state (state is one of "ready", "not ready", "halted"); and
2) The corresponding flag (one per context) is NOT set in any of the Pending Contexts Registers 201 of other contexts (e.g. context 2's pending context register could cause context 3 to pend); and
3) It is the highest priority context that meets conditions 1 and 2.

Priority is calculated by taking the highest of:
a) The priority field in the Context Control Register 403
b) The value in the Claim Priority Register 101.

The value in the Claim Priority Register 101 works as follows:
1) It is initially 0 (lowest priority).
2) If the context with which it is associated takes a claim (i.e. successfully writes a value to the Claim Register 301), and a higher priority context then tries to take the same claim (i.e. write the same value to the Claim Register 301), then the priority of the higher priority context is written to the Claim Priority Register 101, and applied to the context that first took the claim (this is the priority inheritance).
3) When the context relinquishes the claim, the Claim Priority Register 101 is cleared or ignored.

Figure 5:
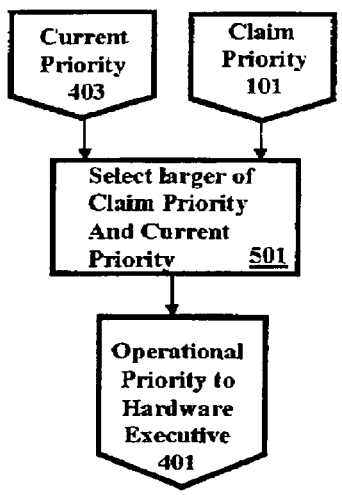

FIG. 5 illustrates the hardware connections between the Claim Priority Register 101 and the Context Control Registers 403 and the hardware kernel 401 and the selection of the greater of the two by selector 501.

Figure 6:
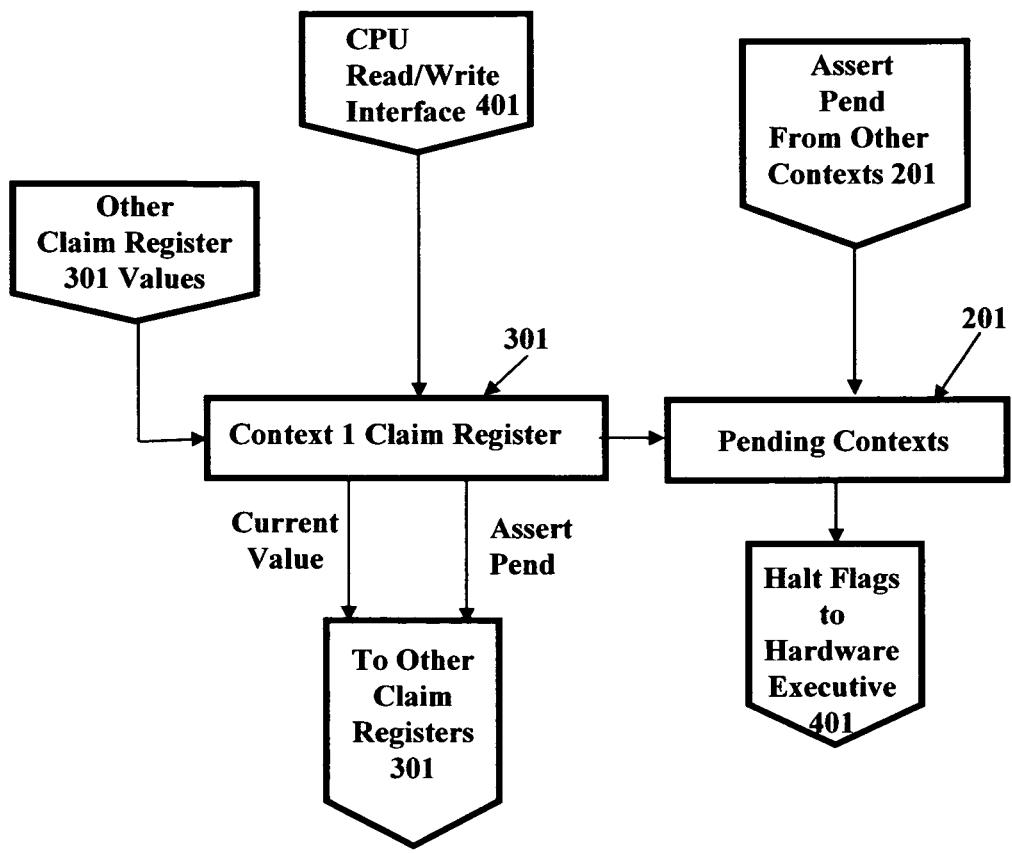

FIG. 6 illustrates the hardware connections between the Claim Register 301 and Pending Context Register 201 of one context with Claim Registers 301 and Pending Context Registers 201 of the other contexts and the hardware kernel 401.

To provide for a priority ceiling solution to the priority inversion problem requires slight changes in the implementation described above. Operation of the circuit is modified by not utilizing the Claim Priority Register 101 and using the lower 5-bits of the Object ID field 303 in the Claim Register 301 as the priority associated with a particular object. Now when an operating system writes its Claim Register, if the write is successful (i.e. if no other Claim Register contains the same value), the current context takes on a priority equal to the value in the 5 least significant bits of the Claim Register if it is higher than the context's current priority. The selection of a priority inheritance or priority ceiling solution is user selectable.

Although the invention has been described in terms of an embodiment utilizing a multi-context micro-processor, it should be understood by those skilled in the art that the present invention is directly applicable to processors in which any multi-thread programming is utilized. It will also be appreciated by those skilled in the art that where the term "context" is utilized, the term "thread" is included. It will also be appreciated by those skilled in the art that the use of the structure provided in the illustrative embodiment provides a hardware "semaphore" to replace the software semaphore utilized in the past.

The invention has been described in terms of embodiments of the invention. It will be apparent to those skilled in the art that various changes and modifications may be made to the illustrative embodiments without departing from the spirit or scope of the invention. It is intended that the invention not be limited to the specific embodiments shown and described. It is intended that the invention be limited in scope only by the scope of the claims appended hereto.

What is claimed is:

1. A method for preventing priority inversion in a processor system having an operating system operable in a master context and a plurality of non-master contexts, said method comprising:
   providing a plurality of context control registers, each of said context control registers being associated with a corresponding one context of said plurality of non-master contexts for controlling execution of said corresponding non-master context;
   providing a plurality of sets of hardware registers, each set of said plurality of sets of hardware registers corresponding to one context of said plurality of non-master contexts, and each set of said plurality of sets of hardware registers not being writeable by software; and
   utilizing said plurality of context control registers and said plurality of sets of hardware registers to prevent priority inversion.

2. A method in accordance with claim 1, comprising:
   operating said plurality of sets of hardware registers in conjunction with said plurality of context control registers to provide priority inheritance.

3. A method in accordance with claim 1, comprising:
   operating said plurality of sets of hardware registers in conjunction with said plurality of context control registers to provide priority ceiling.

4. A method for preventing priority inversion in a processor system having an operating system operable in a master context and a plurality of non-master contexts, said method comprising:
   providing a plurality of context control registers, each of said context control registers being associated with a corresponding one context of said plurality of non-master contexts for controlling execution of said corresponding context;
   providing a plurality of sets of hardware registers, each set of said plurality of sets of hardware registers corresponding to one context of said plurality of non-master contexts, each set of said plurality of sets of hardware registers not being writeable by software; and selectively operating said plurality of sets of hardware registers in conjunction with said plurality of context control registers to provide priority inheritance or priority ceiling to prevent priority inversion.

5. A method in accordance with claim 4, comprising:
selecting all registers in each set of said plurality of sets of hardware registers to provide priority inheritance.

6. A method in accordance with claim 4, comprising:
selecting a subset of registers in each set of said plurality of sets of hardware registers to provide priority ceiling.

7. A method for preventing priority inversion in a processor system having an operating system operable in a plurality of contexts, said method comprising:
providing a plurality of context control registers, each of said context control registers being associated with a corresponding one context of said plurality of contexts for controlling execution of said corresponding context;
providing a plurality of sets of hardware registers, each set of said plurality of sets of hardware registers corresponding to one context of said plurality of contexts, each set of said plurality of sets of hardware registers not being writeable by software;
utilizing said plurality of context control registers and said plurality of sets of hardware registers to prevent priority inversion;
providing in each of said sets of hardware registers one register having a field that is conditionally writeable;
operating each said one register such that a second context of said plurality of contexts will attempt to write a value to said conditionally writeable field to claim a value;
operating said one register such that if a write of a predetermined value to said field is successful said second context takes a claim and may proceed to execute;
operating said one register such that if said write of said predetermined value to said field is not successful said second context will pend until said first context completes execution; and
loaning the priority of said second context to said first context while said first context is executing.

8. A method in accordance with claim 7, comprising;
providing in each said set of said plurality of sets of hardware registers a claim priority register;
operating each said claim priority register such that it has a priority field that is initially in a first state representative of a first priority;
operating each said claim priority register such that if its said corresponding context successfully writes said value to said one register of the same said set and a higher priority third context then tries to take the same claim by writing the same said value to said one register, then writing the priority of said third priority context in said priority field of said claim priority register; and
operating each said claim priority register such that when said second context relinquishes said claim, said claim priority register is either returned to said first state or is ignored.

9. A method in accordance with claim 8, comprising:
determining priority for a context to be executed from the higher of a priority assigned to said context in a priority field of a corresponding one context control register and the value of said priority field of the corresponding said claim priority register.

10. A method in accordance with claim 9, comprising:
providing in each said set of registers one register comprising a plurality of flag fields, each of said flag fields being assigned to a different corresponding to one context of said plurality of contexts;
controlling the execution of each other context of said plurality of contexts by controlling the state of each said flag field of said one register being used to control the execution of its corresponding one context.

11. A method in accordance with claim 7 comprising:
providing in each said set of registers one register comprising a plurality of flag fields, each of said flag fields corresponding to one context of said plurality of contexts;
controlling the execution of each other context of said plurality of contexts by controlling the state of each said flag field of said one register being used to control the execution of its corresponding one context.

12. A processor system having an operating system operable in a plurality of contexts, said system comprising:
a hardware processor kernel comprising a plurality of context control registers, each of said context control registers being associated with a corresponding one context of said plurality of contexts for controlling execution of a context;
a plurality of sets of hardware registers, each set of said plurality of sets of hardware registers corresponding to one context of said plurality of contexts and being automatically operable with said plurality of context control registers to prevent priority inversion, each set of said plurality of sets of hardware registers not being writeable by software.

13. A processor system having an operating system operable in a plurality of contexts, said system comprising:
a hardware processor kernel comprising a plurality of context control registers, each of said context control registers being associated with a corresponding one context of said plurality of contexts for controlling execution of said corresponding context;
a plurality of sets of hardware registers, each set of said plurality of sets of hardware registers corresponding to one context of said plurality of contexts, and each of said set of hardware registers not being writeable by software;
utilizing said plurality of context control registers and said plurality of sets of hardware registers to prevent priority inversion;
each of said sets of hardware registers comprising a claim register having a field that is conditionally writeable;
each said claim register being operable such that a second context of said plurality of contexts will attempt to write a value to said field to seize control from a first context;
each said claim register being further operable such that if a write of a predetermined value to said field is successful said second context takes a claim and may proceed to execute;
each said claim register further operable such that if said write of said predetermined value to said field is not successful said second context will pend until said first context completes execution.

* * * * *